(12) United States Patent
Biester et al.

(10) Patent No.: US 10,788,143 B2
(45) Date of Patent: Sep. 29, 2020

(54) CAM ACTUATED COOLANT CONTROL VALVE

(71) Applicant: Schaeffler Technologies AG & Co. KG, Herzogenaurach (DE)

(72) Inventors: Nathanael Biester, Rochester, MI (US); Vigel Russalian, Macomb, MI (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 8 days.

(21) Appl. No.: 16/160,455

(22) Filed: Oct. 15, 2018

(65) Prior Publication Data
US 2020/0116274 A1   Apr. 16, 2020

(51) Int. Cl.
*F16K 31/524*   (2006.01)

(52) U.S. Cl.
CPC . *F16K 31/52408* (2013.01); *Y10T 137/86445* (2015.04)

(58) Field of Classification Search
CPC .............................................. F16K 31/52408
See application file for complete search history.

(56) References Cited

U.S. PATENT DOCUMENTS

| | | | |
|---|---|---|---|
| 1,801,654 A * | 4/1931 | Blood | B22C 19/04 91/36 |
| 2,012,194 A * | 8/1935 | Hughes | C02F 1/42 210/89 |
| 2,123,979 A | 7/1938 | Ward | |
| 2,233,717 A * | 3/1941 | Shogranar | F16K 31/52408 251/259 |
| 2,628,637 A * | 2/1953 | Pedrick | F16K 31/524 137/635 |
| 2,855,152 A | 10/1958 | Tyler et al. | |
| 3,352,419 A | 11/1967 | Entringer et al. | |
| 3,403,700 A * | 10/1968 | Meynell | F16K 31/52408 137/636.1 |
| 3,477,693 A | 11/1969 | Bezanis | |
| 2015/0041007 A1* | 2/2015 | Kawasaki | F16K 11/0716 137/565.11 |

(Continued)

FOREIGN PATENT DOCUMENTS

DE        1110972 B    7/1961
DE    102016201246 A1   8/2017

OTHER PUBLICATIONS

U.S. Appl. No. 16/041,998, filed Jul. 23, 2018 (unpublished).

*Primary Examiner* — Robert K Arundale
(74) *Attorney, Agent, or Firm* — Volpe and Koenig, P.C.

(57) ABSTRACT

In one embodiment, a thermal management module is disclosed that includes: a housing defining a plurality of ports and at least one camshaft opening, the housing defining at least one chamber; a camshaft extending through the at least one camshaft opening into the chamber, the camshaft including a plurality of cams; a plurality of seal assemblies each surrounding a respective port of the plurality of ports; and a plurality of stoppers each arranged with a respective port of the plurality of ports. In one aspect, at least one port of the plurality of ports includes a guidance finger adapted to guide a respective stopper of the plurality of stoppers. In another aspect, openings defined by at least two ports of the plurality of ports overlap in an axial direction of the openings.

15 Claims, 11 Drawing Sheets

(56) References Cited

U.S. PATENT DOCUMENTS

2015/0225259 A1\* 8/2015 Yamaoka .................. C02F 1/42
137/865
2017/0058753 A1 3/2017 Lee et al.
2017/0314691 A1\* 11/2017 Aboujaib .............. F16K 49/005

\* cited by examiner

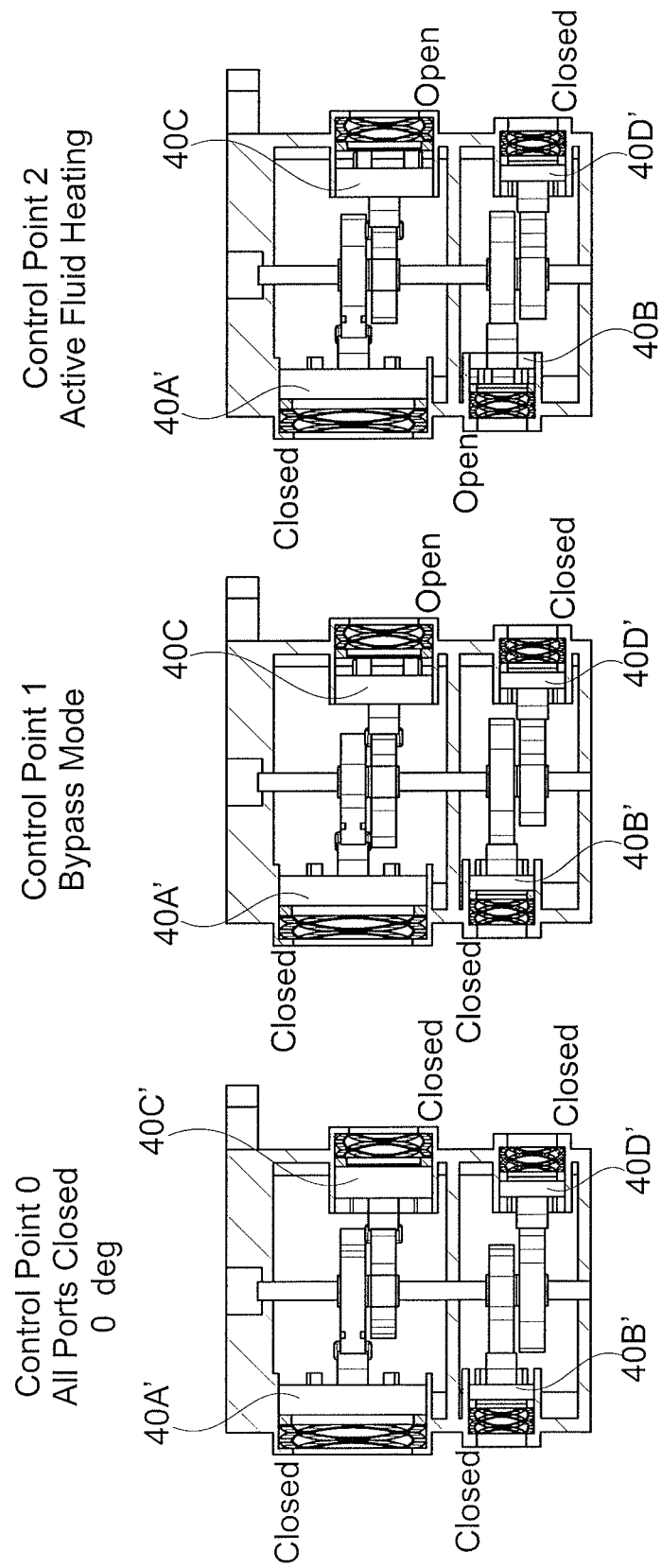

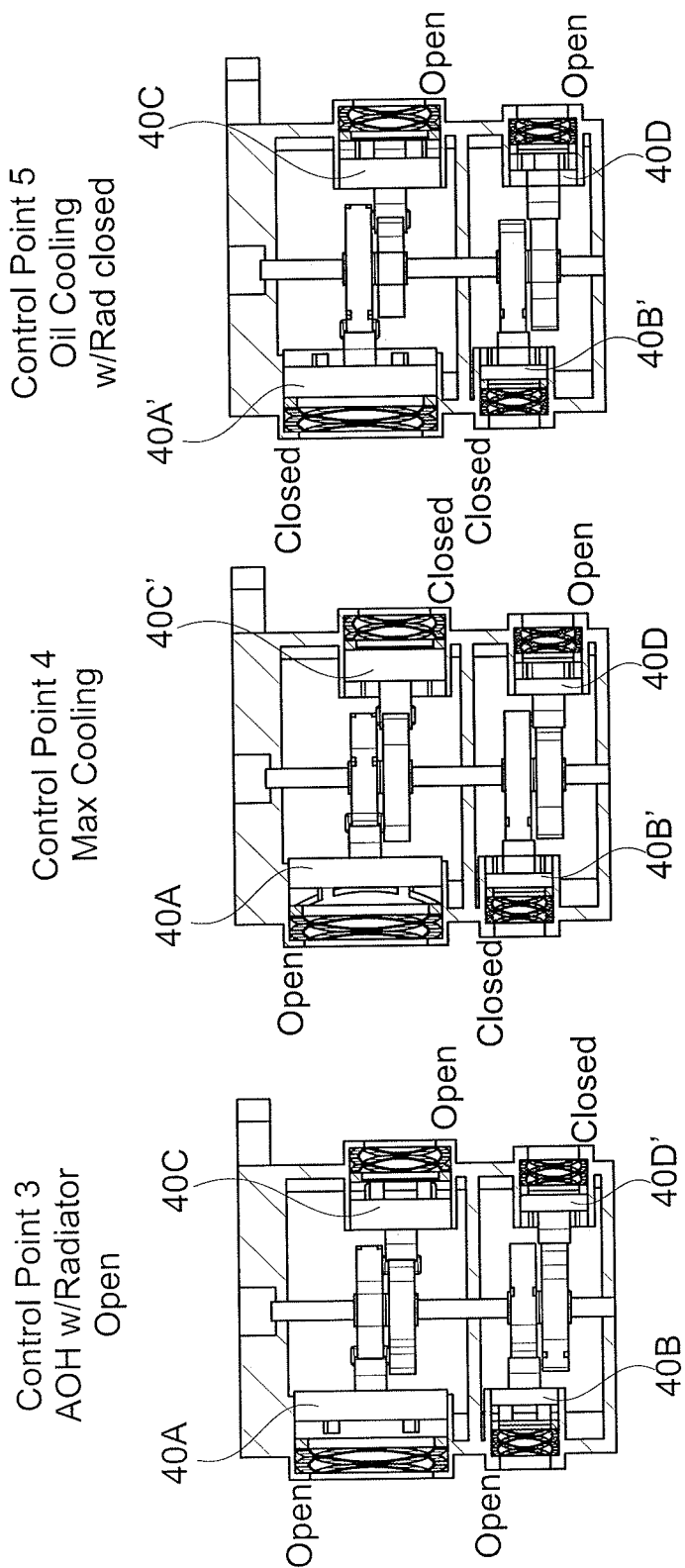

CAM ACTUATED COOLANT CONTROL VALVE

FIELD OF INVENTION

The present invention relates to a thermal management module.

BACKGROUND

Thermal management modules (TMM) or coolant control valves (CCV) are used in a variety of powertrain applications to provide temperature control, which facilitates increased efficiency and other advantages.

Coolant systems are integrated within internal combustion engines to keep the engine at its most efficient operating temperature. If the temperature of the engine is excessively high or low, then engine performance suffers, knocking occurs, or the engine experiences a variety of other detrimental effects. Existing coolant systems are disclosed in US Pub. 2017/0058753 and DE 102016201246.

Thermostatic valves have been used in a variety of applications in the past. It is generally known that valves can be integrated with camshafts. Known cam operated valves are disclosed in U.S. Pat. Nos. 3,477,693; 2,123,979; 3,352,419; and DE 1110972.

One class of known TMM requires ball valves to open and close the inlets and outlets of the TMM. These ball valve TMMs suffer from a variety of problems. For example, the entire port opening of the inlet or outlet must have access to the ball, and multiple balls must be stacked if there are several ports included in a single TMM. Additionally, the size of the balls for the ball valves dictates the overall size of the TMM, which can lead to relatively large packaging sizes for the TMM. Ball valves require sets of primary and secondary seals, and associated springs to stop fluid from entering the ports, which additionally increases the overall size of the TMM. Finally, the primary seals used in these known ball valve applications are subject to leakage and uneven wear.

Known TMMs suffer from a variety of drawbacks, including excessive installation space, inadequate sealing of valve bodies, and excessive wear between sealing components.

It would be desirable to provide a TMM that is compact and provides a reliable sealing function between seal components.

SUMMARY

In one embodiment, A thermal management module (TMM) is disclosed including a housing defining a plurality of ports and at least one camshaft opening, the housing defining a chamber; a camshaft extending through the at least one camshaft opening into the chamber, the camshaft including a plurality of cams; a plurality of seal assemblies each surrounding a respective port of the plurality of ports; and a plurality of stoppers each arranged with a respective port of the plurality of ports.

In one aspect, at least one port of the plurality of ports includes a guidance finger adapted to contact an outermost circumferential surface of a respective stopper of the plurality of stoppers.

In another aspect, each seal assembly of the plurality of seal assemblies includes a biasing element, a support ring, and a seal ring body.

In one aspect, the biasing element drives the seal ring body against a respective stopper of the plurality of stoppers.

In another aspect, each stopper of the plurality of stoppers has a circular disk-shaped profile and defines a flat sealing surface configured to engage a respective seat defined by the plurality of seal assemblies.

In one aspect, a retainer is arranged between at least one stopper of the plurality of stoppers and a respective cam of the plurality of cams, such that the at least one stopper is driven to engage and disengage with a respective seal assembly of the plurality of seal assemblies based on a position of the respective cam.

In another aspect, the chamber is divided into a first sub-chamber and a second sub-chamber. The plurality of ports includes a first port, a second port, a third port, and a fourth port. The first port is a first outlet port, the second port is a second outlet port, the third port is a first inlet port, and the fourth port is a second inlet port. The first port and the second port are connected to the first sub-chamber, and the third port and the fourth port are connected to the second sub-chamber.

In one aspect, the plurality of cams each have a hollow inner space formed by an outer body defining a cam surface and a plurality of webs extending from a central mounting portion to the outer body.

BRIEF DESCRIPTION OF THE DRAWINGS

The foregoing Summary and the following detailed description will be better understood when read in conjunction with the appended drawings, which illustrate a preferred embodiment of the invention. In the drawings:

FIGS. 8A-8F illustrate side cross-sectional views of the thermal management module in varying states.

DETAILED DESCRIPTION OF THE PREFERRED EMBODIMENTS

Figure 1:
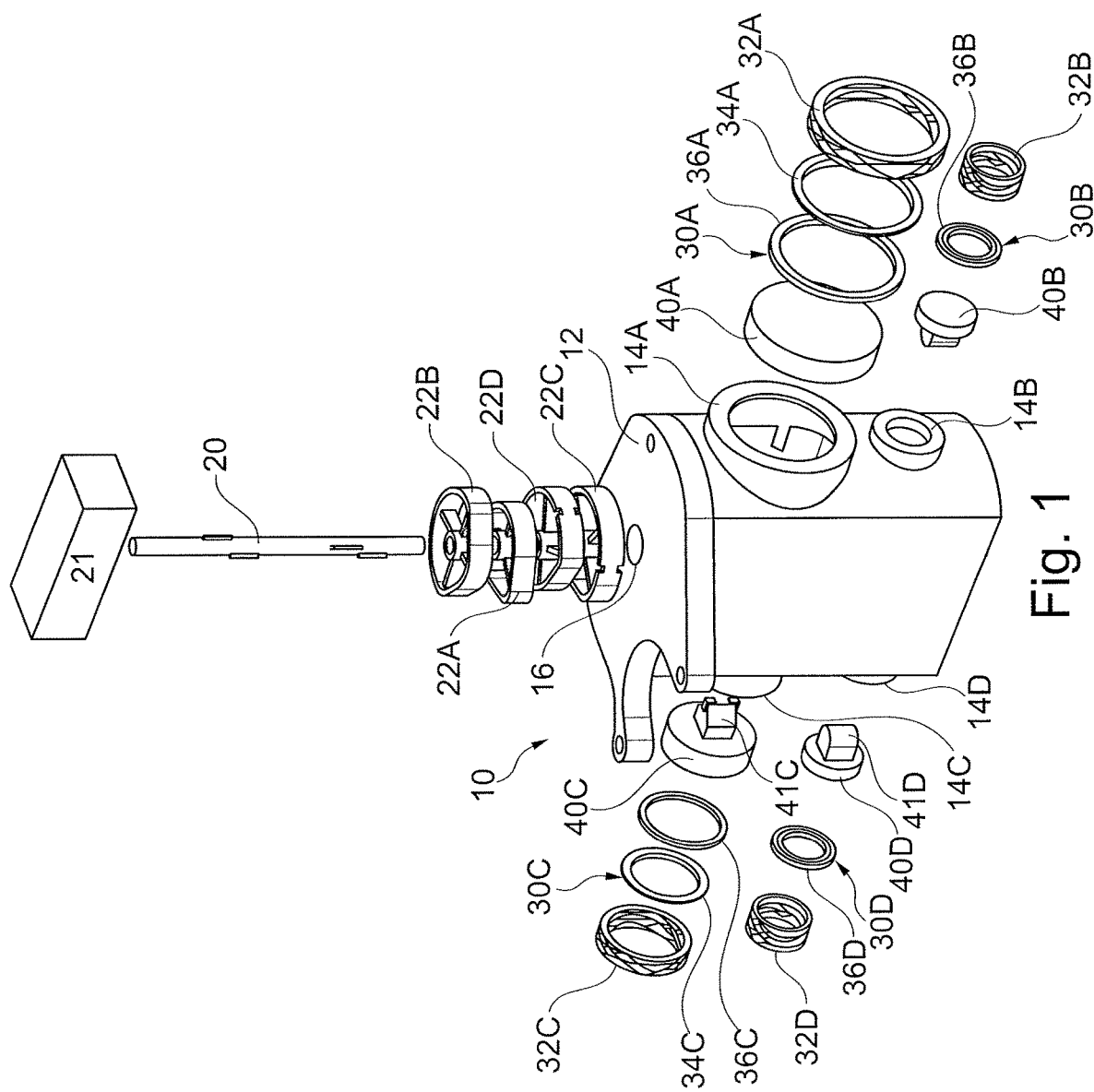
FIG. 1 is a perspective exploded view of thermal management module according to an embodiment.

Certain terminology is used in the following description for convenience only and is not limiting. The words "front," "rear," "upper" and "lower" designate directions in the drawings to which reference is made. The words "inwardly" and "outwardly" refer to directions toward and away from the parts referenced in the drawings. "Axially" refers to a direction along the axis of a shaft or circular opening. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

A thermal management module 10 is shown in FIG. 1. The module 10 includes a housing 12 defining a plurality of ports 14A, 14B, 14C, 14D and at least one camshaft opening 16. The ports 14A, 14B, 14C, 14D are described in more detail herein. Although four ports 14A, 14B, 14C, 14D are shown in the drawings, one of ordinary skill in the art would understand that the port configuration can be varied depending on a specific application.

In one embodiment, the first port 14A is a first outlet port; the second port 14C is a second outlet port; the third port 14B is a first inlet port; and the fourth port 14D is a second inlet port.

The housing 12 defines a chamber 18. In one embodiment, the chamber 18 defines two sub-chambers 18A, 18B. The chambers 18A, 18B can be separated by a partition 18C. The function of these sub-chambers 18A, 18B are discussed in more detail herein. One of ordinary skill in the art would understand that additional or different chambers can be formed, depending on the specific application.

In one embodiment, and the first port 14A and the second port 14C are connected to the first sub-chamber 18A, and the third port 14B and the fourth port 14D are connected to the second sub-chamber 18B.

Figure 5A:
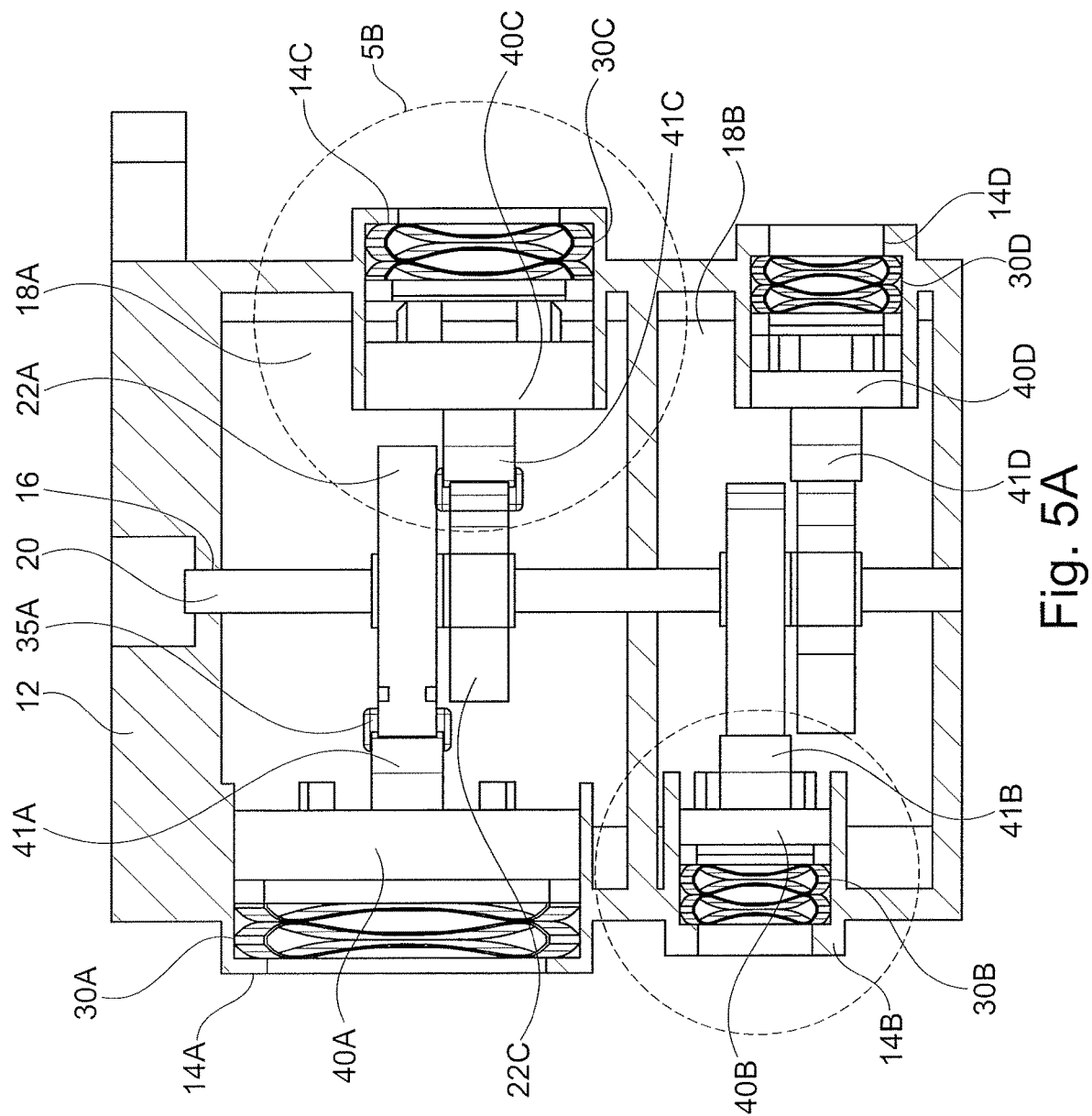
FIG. 5A is a side cross-sectional view of the thermal management module.

As shown most clearly in FIG. 5A, the first port 14A and the second port 14C are arranged on opposite lateral sides of the housing 12. As shown in FIG. 5A, openings defined by the first port 14A and the second port 14C overlap in an axial direction. The same configuration is provided for the third port 14B and the fourth port 14D such that openings of these ports 14B, 14D overlap in an axial direction. This configuration provides a more compact overall housing 12 compared to known arrangements. As shown in FIG. 5A, there are a pair of cams 22A, 22C in the first sub-chamber 18A. Cam 22A is configured to engage with stopper 40A and cam 22C is configured to engage with stopper 40C. Cam 22A overlaps with the openings formed by both port 14A and port 14C, and cam 22C overlaps with the openings formed by both port 14A and port 14C. A similar configuration is provided for cams 22B, 22D and openings for ports 14B, 14D in sub-chamber 18B. In other words, each of the cams 22A, 22B, 22C, 22D overlap with an opening for a port 14A, 14B, 14C, 14D for which the cam 22A, 22B, 22C, 22D does not affect the opening and closing of the port 14A, 14B, 14C, 14D. This configuration further reduces the overall size of the housing 12.

Figure 2:
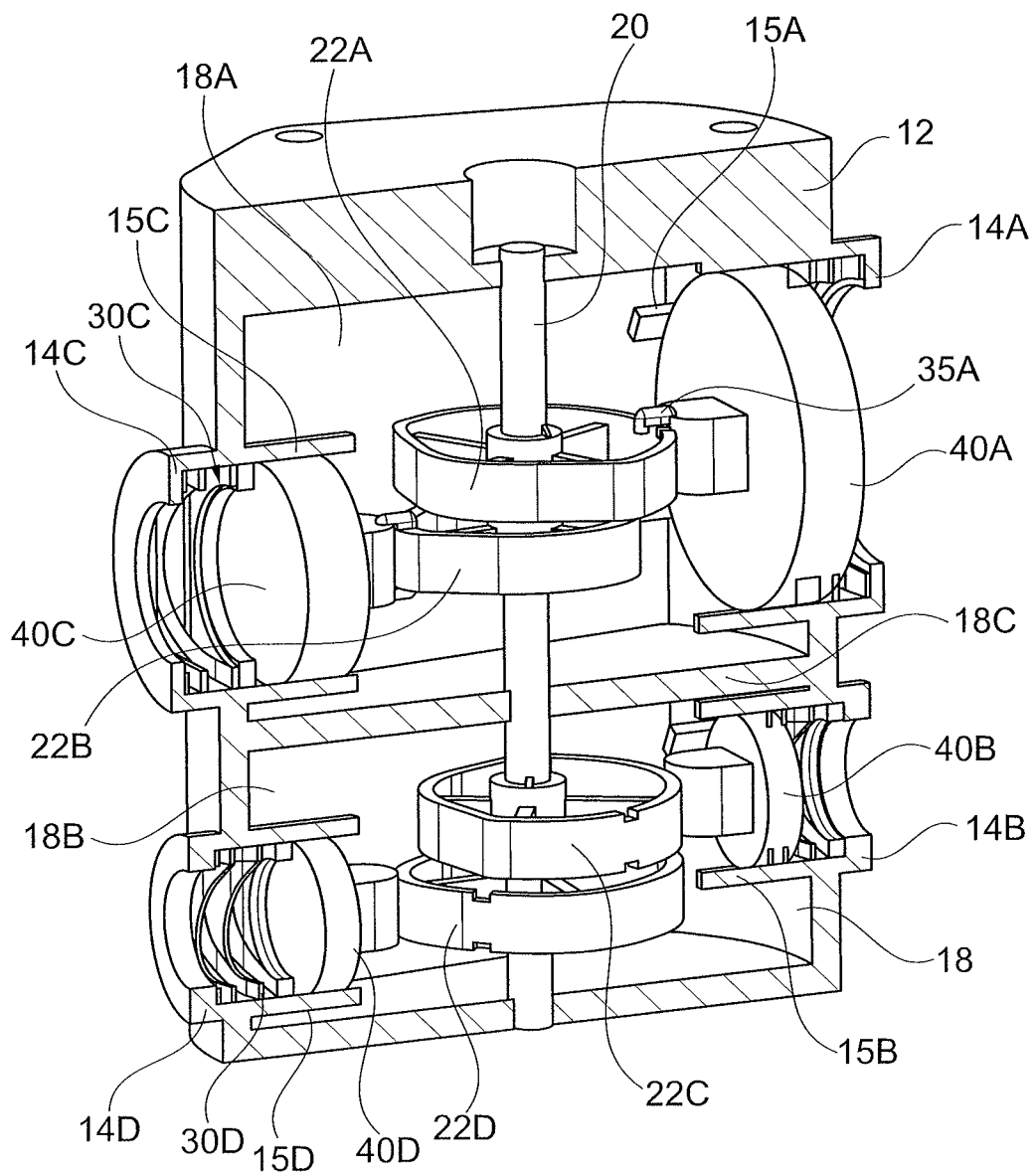
FIG. 2 is a cross-sectional perspective view of the thermal management module of FIG. 1 in a first condition.
Figure 3:
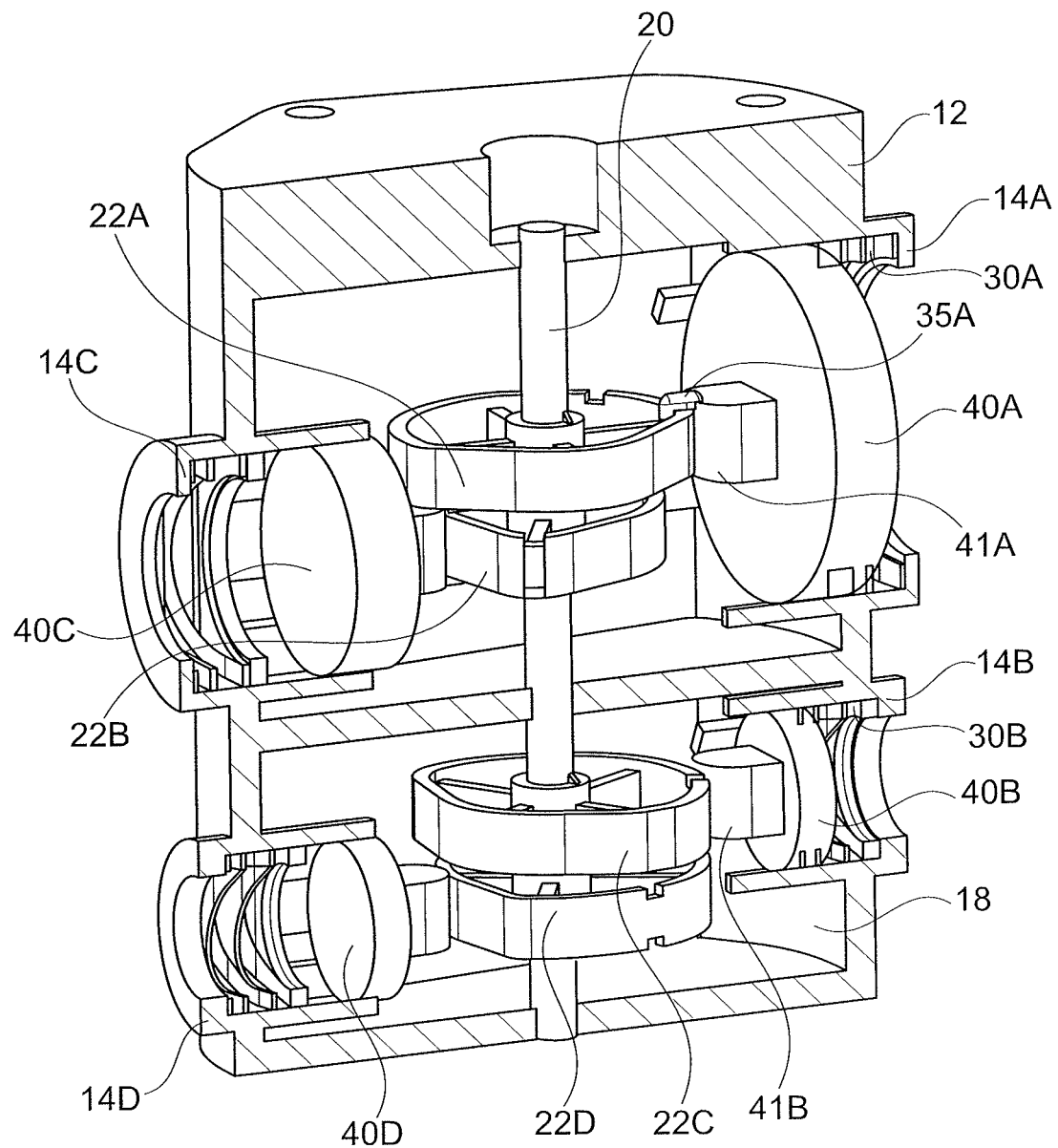
FIG. 3 is a cross-sectional perspective view of the thermal management module of FIG. 1 in a second condition.
Figure 4:
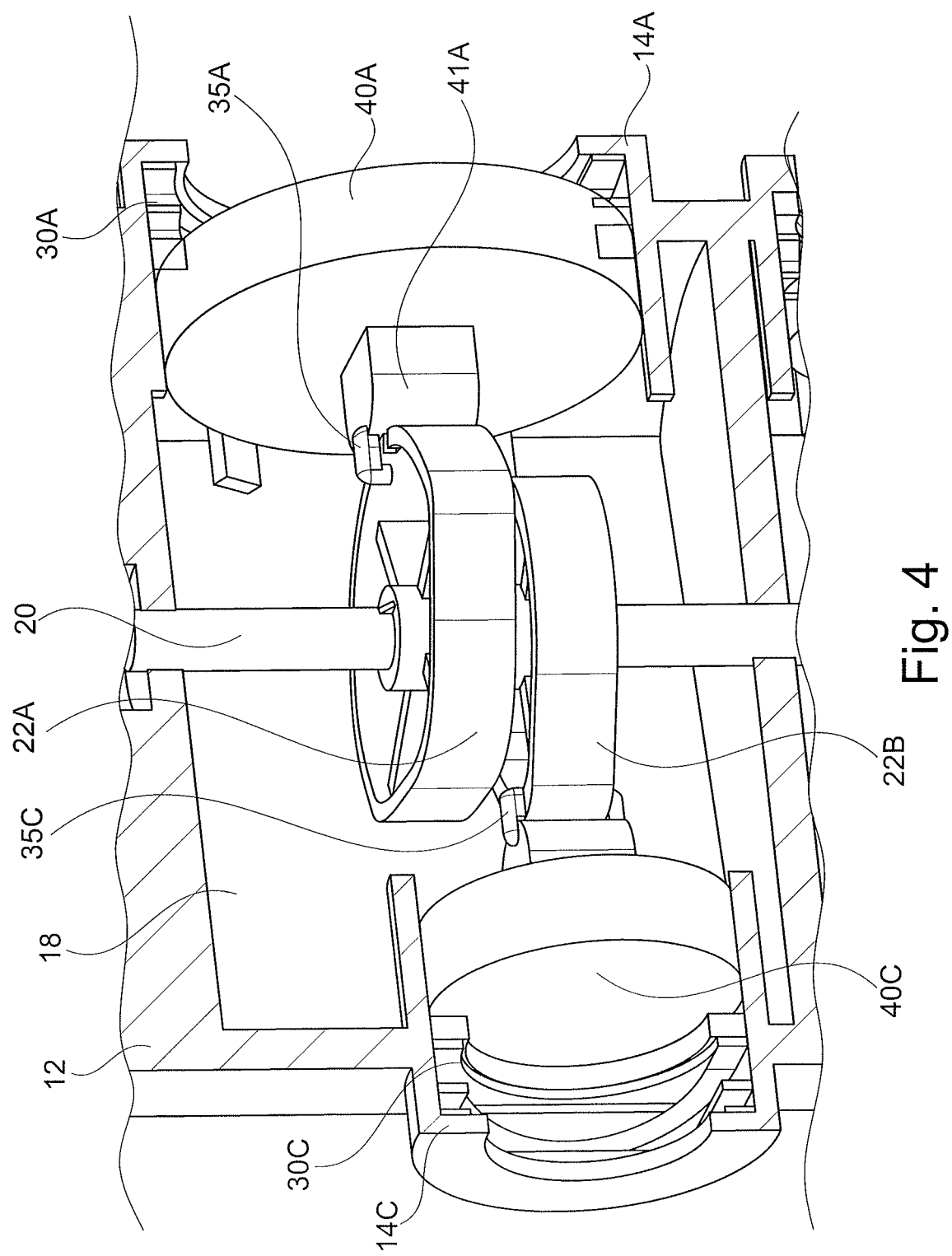
FIG. 4 is a magnified view of a portion of the thermal management module in the first condition.

As shown in FIGS. 2 and 3, a camshaft 20 extends through the at least one camshaft opening 16 into the chamber 18. The camshaft 20 includes a plurality of cams 22A, 22B, 22C, 22D. Although only four cams are illustrated in the figures, one of ordinary skill in the art would understand that the configuration of the cams can be varied depending on a specific application. The camshaft 20 is driven by an external motor.

In one embodiment, the camshaft 20 is attached to an actuator 21, shown in FIG. 1. In one embodiment, the actuator 21 is connected to a controller which communicates electronically with the actuator 21. The actuator 21 rotates the cams 22A, 22B, 22C, 22D to a specific angular position, determined by the controller. The controller can make angular position decisions based on a variety of different input signals, such as operating conditions, sensor feedback, desired state of the module 10, etc. In one embodiment, the desired state of the module 10 can be based on the temperature state, valve position, flow state, etc. One of ordinary skill in the art would understand that a sensor can be integrated into the module 10 to detect valve position, temperature, flow state, or any other condition of the module 10. Based on the arrangement of the actuator 21, the angular position of the cams 22A, 22B, 22C, 22D is fully variable, i.e. the cams 22A, 22B, 22C, 22D can be rotated to any desired position. The actuator 21 and its associated controller can be implemented into any one of the embodiments disclosed herein. The controller can include any known electronic components, such as a processor, CPU, memory. The controller can include a programmable logic controller, input/output interface, and other known electronic components.

Figure 6A:
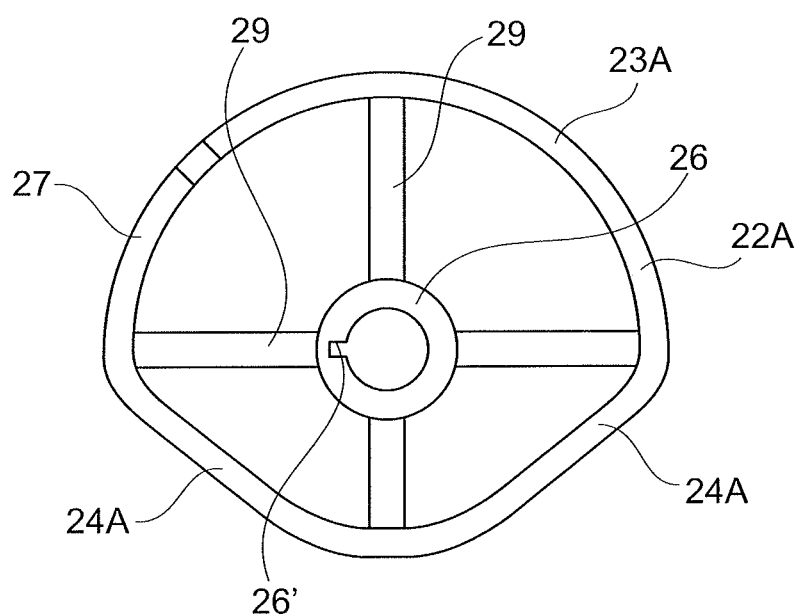
FIGS. 6A and 6B illustrate a top planar view and a perspective view, respectively, of a cam for the thermal management module.

The cams 22A, 22B, 22C, 22D can each have an identical construction, or the construction can be varied depending on a specific application. One of the cams 22A is shown in more detail in FIGS. 6A and 6B. As shown in FIG. 6A, the cam 22A can have a generally, uniformly curved profile 23A for at least 180 degrees. The remaining 180 degrees of the outer surface of the cam 22A includes separate generally linear surfaces 24A. The profile of the cams can be modified to include additional linear surfaces or curved surfaces.

Figure 6B:
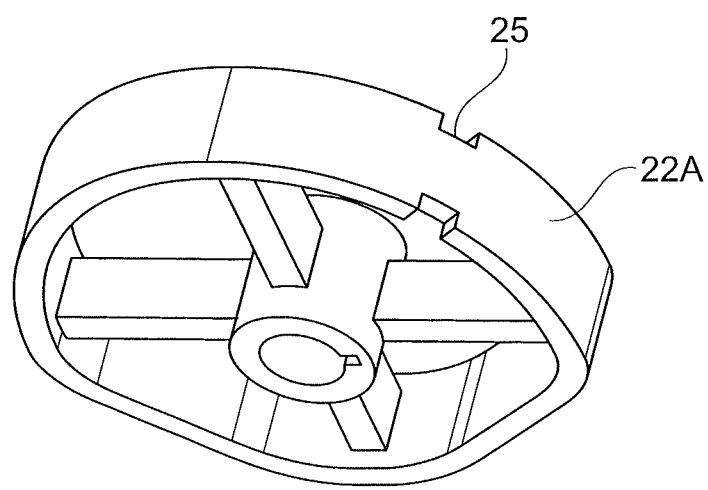
Figure 7:
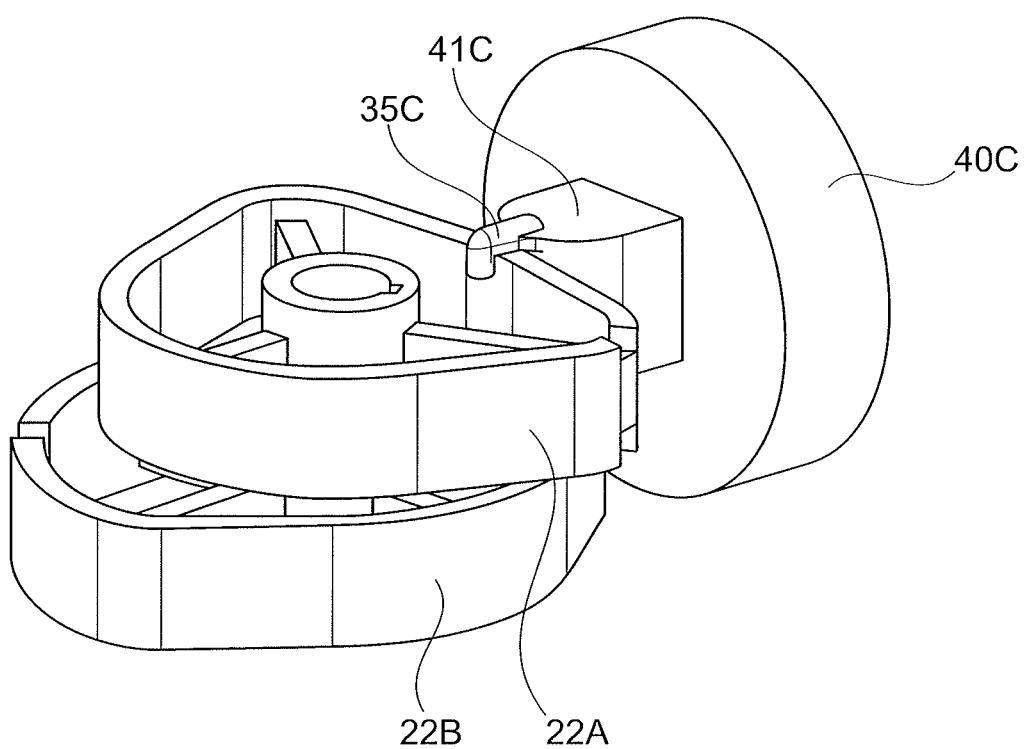
FIG. 7 is a perspective view of an interface between a cam and a stopper of the thermal management module.

As shown in more detail in FIGS. 6A and 6B the cam 22A includes an outer body 27 defining a cam surface 23A, 24A and a plurality of webs 29 extending from a central mounting portion 26. The central mounting portion 26 can include a detent or key 26' that is shaped to mate with a corresponding component on the camshaft 20 such that the camshaft 20 and cams are rotationally locked with each other. The cams 22A, 22B, 22C, 22D all generally have a hollow construction, i.e. the cams 22A, 22B, 22C, 22D are not solid between the outer lobe surfaces and a connection portion to the camshaft 20. In other words, when viewed in an axial direction of the cams 22A, 22B, 22C, 22D a majority of an interior of the cams 22A, 22B, 22C, 22D defined inside of the outer body/lobe surface is open. This hollow construction provides improved fluid flow through the associated chambers.

An insertion feature 25 (i.e. indentation) is formed on an outer surface of the cam 22A. The indentation 25 is formed on two sides of the outer surface of the cam 22A. Although the indentation 25 is only labeled on the cam 22A, the indentation 25 can be formed on any of the cams 22A, 22B, 22C, 22D.

The module 10 includes a plurality of seal assemblies 30A, 30B, 30C, 30D each surrounding a respective port of the plurality of ports 14A, 14B, 14C, 14D. In one embodiment, the seal assemblies can include a biasing element, a support ring, and a seal ring body. As shown in FIG. 1, seal assembly 30A includes biasing element 32A, support ring 34A, and seal ring body 36A; seal assembly 30B includes biasing element 32B and seal ring body 36B; seal assembly 30C includes biasing element 32C, support ring 34C, and seal ring body 36C; and seal assembly 30D includes biasing element 32D and seal ring body 36D. The biasing elements 32A, 32B, 32C, 32D generally prevent any leakage.

In one embodiment, the outlet ports 14A, 14C require support rings 34A, 34C and the inlet ports 14B, 14D do not require support rings. One of ordinary skill in the art would understand that an outlet port can require a rigid component to maintain a sealing shape and configuration. Due to the internal pressure, inlets generally do not require a support ring. However, one of ordinary skill in the art would understand that support rings can be provided for any port. The seal assemblies 30A, 30B, 30C, 30D can include any one or more of the sub-components. Additionally, specific characteristics of any one of the biasing element, the support ring, and the seal ring body can be varied, such as the stiffness of the bias element, thickness of support ring, etc.

Figure 5B:
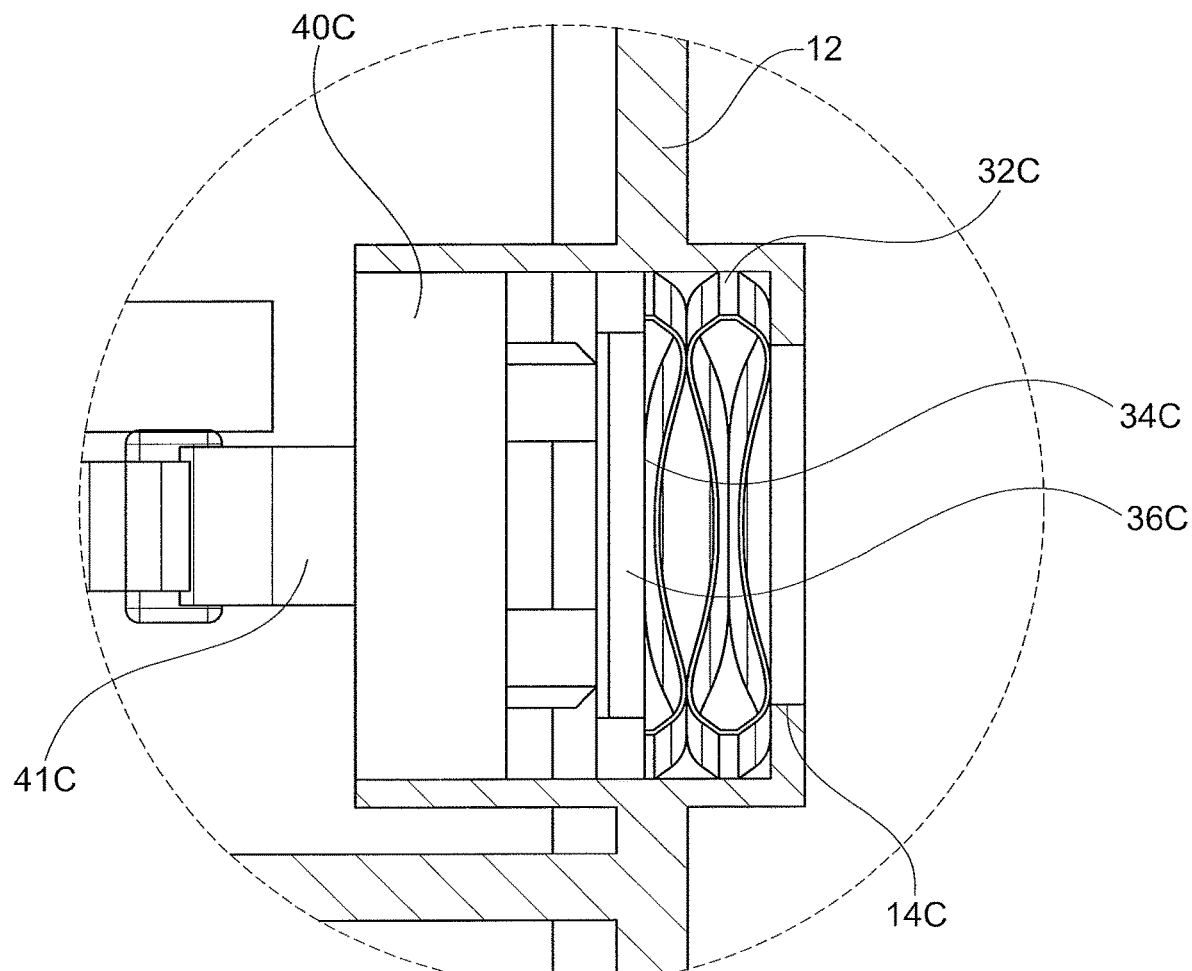
FIG. 5B is a side cross-sectional view of a specific port of the thermal management module of FIG. 5A.
Figure 5C:
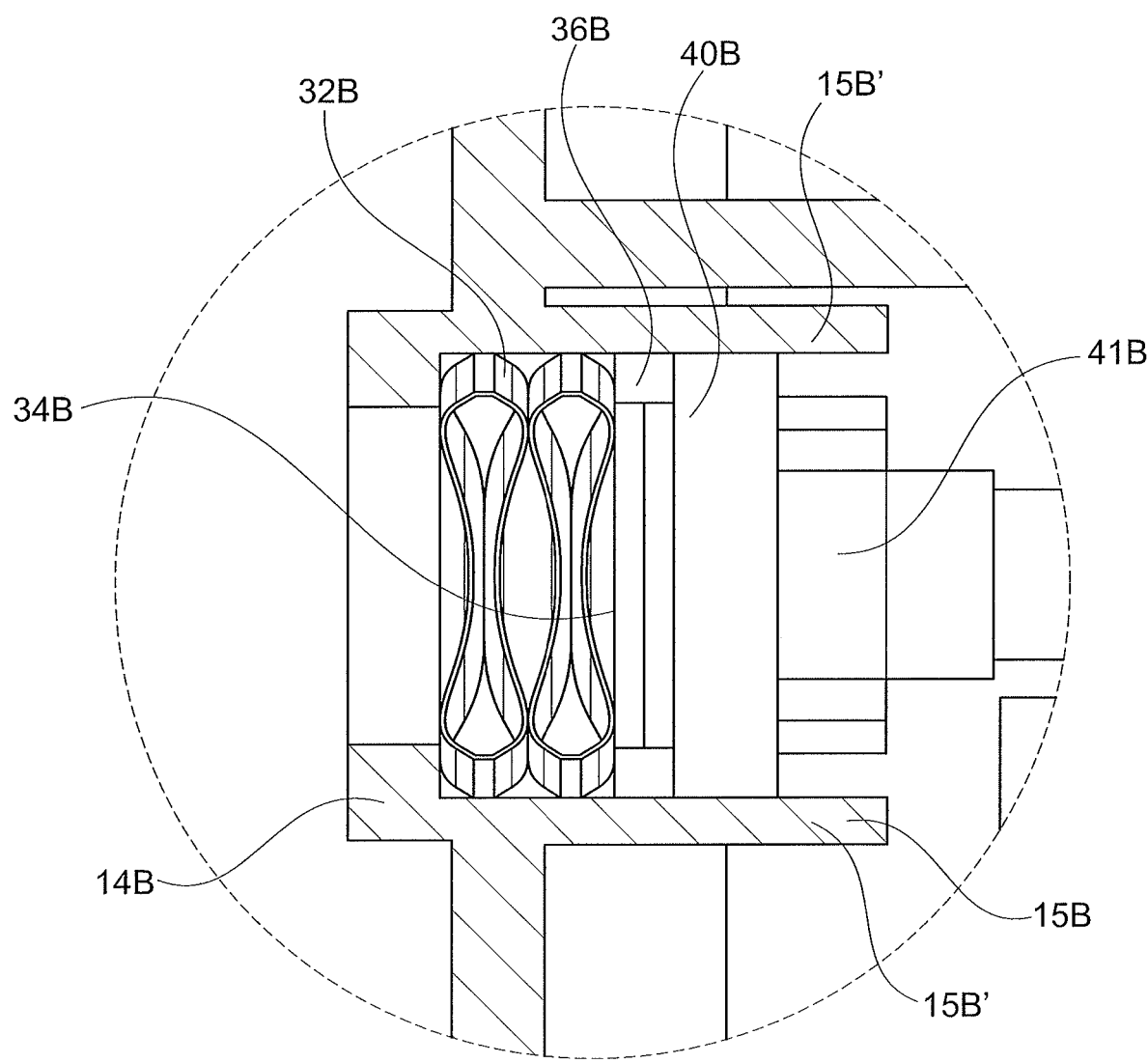
FIG. 5C is a side cross-sectional view of another port of the thermal management module of FIG. 5A.

The structure of the seal assemblies 30A, 30B, 30C, 30D and the arrangement of the seal assemblies 30A, 30B, 30C, 30D within the housing 12 are more clearly shown in detail in FIGS. 5A-5C.

As shown in FIG. 1, a plurality of stoppers 40A, 40B, 40C, 40D are arranged with a respective port of the plurality of ports 14A, 14B, 14C, 14D. As shown in the drawings, the stoppers 40A, 40B, 40C, 40D have a circular disk-shaped profile and define a flat sealing surface configured to engage a respective seat defined by the plurality of seal assemblies. The biasing elements 32A, 32B, 32C, 32D each drive the seal ring body 36A, 36B, 36C, 36D against a respective stopper of the plurality of stoppers 40A, 40B, 40C, 40D.

As shown in FIG. 2, each port of the plurality of ports 14A, 14B, 14C, 14D includes fingers 15A, 15B, 15C, 15D configured to guide the plurality of stoppers 40A, 40B, 40C, 40D. The fingers 15A, 15B, 15C, 15D can be formed as a plurality of fingers spaced circumferentially apart from each other. Alternatively, the fingers 15A, 15B, 15C, 15D can be formed as axially extending bores or collars that define a continuous guide surface. The size and extent of the fingers 15A, 15B, 15C, 15D can be modified to provide a controlled amount of fluid flow through the ports between the fingers 15A, 15B, 15C, 15D. The fingers 15A, 15B, 15C, 15D provide a linear guidance feature for the stoppers 40A, 40B, 40C, 40D and ensure that the stoppers 40A, 40B, 40C, 40D do not tilt or otherwise become misaligned during liner motion between the cams 20A, 20B, 20C, 20D and the seal assemblies 30A, 30B, 30C, 30D.

The fingers 15A, 15B, 15C, 15D constantly engage a circumferential edge of the stoppers 40A, 40B, 40C, 40D, regardless of whether the stoppers 40A, 40B, 40C, 40D are in a closed or open position relative to the ports 14A, 14B, 14C, 14D. In this way, the stoppers 40A, 40B, 40C, 40D maintain contact with the guiding surfaces such that misalignment or titling of stoppers 40A, 40B, 40C, 40D is prevented.

In one embodiment, each set of fingers 15A, 15B, 15C, 15D includes sub-fingers 15B'. In one embodiment, two sub-fingers are spaced 180 degrees from each other. In another embodiment, each set of fingers 15A, 15B, 15C, 15D includes four sub-fingers that are spaced 90 degrees from each other. Alternative configurations of sub-fingers arranged at varying angular distances from each other can be used.

FIG. 2 illustrates all of the ports 14A, 14B, 14C, 14D in a closed state and FIG. 3 illustrates all of the ports 14A, 14B, 14C, 14D in an open state. One of ordinary skill in the art would understand that the ports 14A, 14B, 14C, 14D, cams 20A, 20B, 20C, 20D, and stoppers 40A, 40B, 40C, 40D can be modified such that varying rotational positions of the cams 20A, 20B, 20C, 20D can provide any variation of closed/open states for the ports 14A, 14B, 14C, 14D.

In one embodiment, a retainer is arranged between at least one stopper 40A, 40B, 40C, 40D and a respective cam 20A, 20B, 20C, 20D, such that the at least one stopper 40A, 40B, 40C, 40D is driven to engage and disengage with a respective seal assembly of the plurality of seal assemblies 30A, 30B, 30C, 30D.

As shown in FIG. 5A, the stoppers 40A, 40B, 40C, 40D each include an integrally formed protrusion 41A, 41B, 41C, 41D. The retainer configuration generally retracts the stoppers 40A, 40B, 40C, 40D from a closed position to lift the stoppers 40A, 40B, 40C, 40D off of the seal assemblies 30A, 30B, 30C, 30D based on the position of the cams 20A, 20B, 20C, 20D.

The retainer can be implemented in a variety of ways and structures. In one embodiment, the retainer is formed as a retention arm 35A, 35C extending from the protrusions 41A, 41C which is inserted into the indentation 25 formed on the cams 22A, 22C. In one embodiment, the retention arms 35A, 35C essentially have an L-shaped hook shape. The retention arms 35A, 35C ride along an interior surface of the outer body 27 of the cams 22A, 22C as the cams 22A, 22C rotate with the camshaft 20. The arms 35A, 35C pull the stoppers 40A, 40C off of the associated sealing seats against the internal pressure of the sub-chamber 18A. One of ordinary skill in the art understands that other configurations could be used for the retention arms 35A, 35C.

In one embodiment, only outlet ports 14A, 14C include the retainer, i.e. the retention arms 35A, 35C extending from the stoppers 40A, 40C and the indentations 25 formed on the cams 22A, 22C, since these are the stoppers 40A, 40C that are required to act against the internal pressure of the sub-chamber 18A. However, one of ordinary skill in the art would understand that the retainer can be implemented on any one or more of the cams and stoppers.

FIGS. 8A-8F illustrate varying modes for the thermal management module. These modes are provided as exemplary modes only, and one of ordinary skill in the art recognizes that an extremely large variety of modes are available depending on varying arrangements and configurations of the components of the module. In one embodiment, the first port 14A corresponds to an outlet connection to a radiator, the second port 14C corresponds to an outlet connection to a bypass conduit, the third port 14B corresponds to an inlet to an integrated exhaust manifold (IEM), and the fourth port 14D corresponds to an inlet connection to a pump, sometimes referred to as an engine mounted pump.

FIG. 8A corresponds to a camshaft 20 rotational position of 0 degrees, with the first port 14A, second port 14C, third port 14B, and fourth port 14D all closed.

FIG. 8B corresponds to a camshaft rotational position of 60 degrees, with the first port 14A, third port 14B, and fourth port 14D closed, and the second port 14C open. This mode corresponds to a bypass mode.

FIG. 8C corresponds to a camshaft rotational position of 120 degrees in which the first port 14A and the fourth port 14D are closed and the second port 14C and the third port 14B are open. This mode corresponds to an active fluid heating mode.

FIG. 8D corresponds to a camshaft rotational position of 180 degrees in which the first port 14A, second port 14C, and third port 14B are open and the fourth port 14D is closed. This mode corresponds to an active oil heating mode with the radiator connection open.

FIG. 8E corresponds to a camshaft rotational position of 240 degrees in which the first port 14A and fourth port 14D are open, and the second port 14C and the third port 14B are closed. This mode corresponds to a max cooling mode.

Finally, FIG. 8F corresponds to a camshaft rotational position of 300 degrees in which the first port 14A and the third port 14B are closed and the second port 14C and the fourth port 14D are open. This mode corresponds to a fluid cooling mode with the radiator closed.

Although the sub-chambers 18A, 18B are illustrated as being stacked on top of each other in an axial direction of the camshaft 20, one of ordinary skill in the art would understand that alternative configurations could be provided. For example, the outlet ports 14A, 14C could be arranged along a plane that is perpendicular to the inlet ports 14B, 14D.

In general, the present disclosure reduces the necessary space of a housing 12 by offsetting the ports with respect to a lateral/radial surface of the housing 12.

Any one or more of the features of any single one of the stoppers can be incorporated into any one or more of the other stoppers. Any one or more of the features of any single one of the cams can be incorporated into any one or more of the other cams.

Having thus described the present invention in detail, it is to be appreciated and will be apparent to those skilled in the art that many physical changes, only a few of which are exemplified in the detailed description of the invention, could be made without altering the inventive concepts and principles embodied therein.

It is also to be appreciated that numerous embodiments incorporating only part of the preferred embodiment are possible which do not alter, with respect to those parts, the inventive concepts and principles embodied therein. The present embodiment and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

LOG OF REFERENCE NUMERALS

Thermal management module 10
Housing 12
Ports 14
Camshaft opening 16
Chamber 18
Camshaft 20
Actuator 21
Cams 22
Cam surfaces 23, 24
Indentation 25
Central mounting portion 26
Key 26'
Outer body 27
Webs 29
Seal assembly 30
Biasing element 32
Support ring 34
Arm 35
Seal ring body 36
Stopper 40
Protrusion 41

What is claimed is:

1. A thermal management module comprising:
a housing defining a plurality of ports and at least one camshaft opening, the housing defining a chamber;
a camshaft extending through the at least one camshaft opening into the chamber, the camshaft including a plurality of cams;
a plurality of seal assemblies each surrounding a respective port of the plurality of ports; and
a plurality of stoppers each arranged with a respective port of the plurality of ports;
wherein openings defined by at least two ports of the plurality of ports overlap in an axial direction of the openings, and
each seal assembly of the plurality of seal assemblies includes a biasing element and a seal ring body, and the biasing element drives the seal ring body against a respective stopper of the plurality of stoppers.

2. The thermal management module of claim 1, wherein each stopper of the plurality of stoppers has a circular disk-shaped profile and defines a flat sealing surface configured to engage a respective seat defined by the plurality of seal assemblies.

3. The thermal management module of claim 1, wherein a retainer is arranged between at least one stopper of the plurality of stoppers and a respective cam of the plurality of cams, such that the at least one stopper is pulled away from a respective port of the plurality of ports by the respective cam based on a rotational position of the respective cam.

4. The thermal management module of claim 1, wherein the chamber is divided into a first sub-chamber and a second sub-chamber,
the plurality of ports includes a first port, a second port, a third port, and a fourth port, wherein:
the first port is a first outlet port,
the second port is a second outlet port,
the third port is a first inlet port,
the fourth port is a second inlet port; and
the first port and the second port are connected to the first sub-chamber, and the third port and the fourth port are connected to the second sub-chamber.

5. The thermal management module of claim 1, wherein the plurality of cams each have a hollow inner space formed by an outer body defining a cam surface and a plurality of webs extending from a central mounting portion to the outer body.

6. The thermal management module of claim 1, wherein the plurality of cams includes four cams, and each of the four cams are each rotationally connected to the camshaft.

7. The thermal management module of claim 1, wherein at least one port of the plurality of ports includes a guidance finger in continuous contact with an outermost circumferential edge of a respective stopper.

8. The thermal management module of claim 1, wherein the camshaft is connected to an actuator, such that the camshaft is rotationally driven by the actuator, and a relative position of the plurality of stoppers to an associated port of the plurality of ports is fully variable based on a position of the camshaft.

9. The thermal management module of claim 8, wherein the relative position of the plurality of stoppers to the associated port of the plurality of ports is adjusted based on at least one of: operating conditions of the thermal management module, flow state, or temperature state.

10. A thermal management module comprising:
a housing defining a plurality of ports and at least one camshaft opening, the housing defining a chamber;
a camshaft extending through the at least one camshaft opening into the chamber, the camshaft including a plurality of cams;
a plurality of seal assemblies each surrounding a respective port of the plurality of ports;
a plurality of stoppers each arranged with a respective port of the plurality of ports; and
a retainer arranged between at least one stopper of the plurality of stoppers and a respective cam of the plurality of cams, such that the at least one stopper is pulled away from a respective port of the plurality of ports by the respective cam based on a rotational position of the respective cam, wherein at least one port of the plurality of ports includes a guidance finger in continuous contact with a circumferential edge of a respective stopper.

11. The thermal management module of claim 10, wherein each stopper of the plurality of stoppers has a circular disk-shaped profile and defines a flat sealing surface configured to engage a respective seat defined by the plurality of seal assemblies.

12. The thermal management module of claim 10, wherein the at least one stopper is driven to engage and disengage with a respective seal assembly of the plurality of seal assemblies based on a position of the respective cam.

13. The thermal management module of claim 10, wherein openings defined by at least two ports of the plurality of ports overlap in an axial direction of the openings.

14. The thermal management module of claim 10, wherein the plurality of cams each have a hollow inner space formed by an outer body defining a cam surface and a plurality of webs extending from a central mounting portion to the outer body.

15. A thermal management module comprising:
a housing defining a plurality of ports and at least one camshaft opening, the housing defining a chamber;
a camshaft extending through the at least one camshaft opening into the chamber, the camshaft including a plurality of cams;
a plurality of seal assemblies each surrounding a respective port of the plurality of ports; and
a plurality of stoppers each arranged with a respective port of the plurality of ports;
wherein a retainer is arranged between at least one stopper of the plurality of stoppers and a respective cam of the plurality of cams,
such that the at least one stopper is driven to engage and disengage with a respective seal assembly of the plurality of seal assemblies based on a position of the respective cam, and
the retainer includes a retention arm formed on at least one stopper of the plurality of stoppers, and the retention arm hooks onto the respective cam of the plurality of cams.

* * * * *